No. 784,478. Patented March 7, 1905.

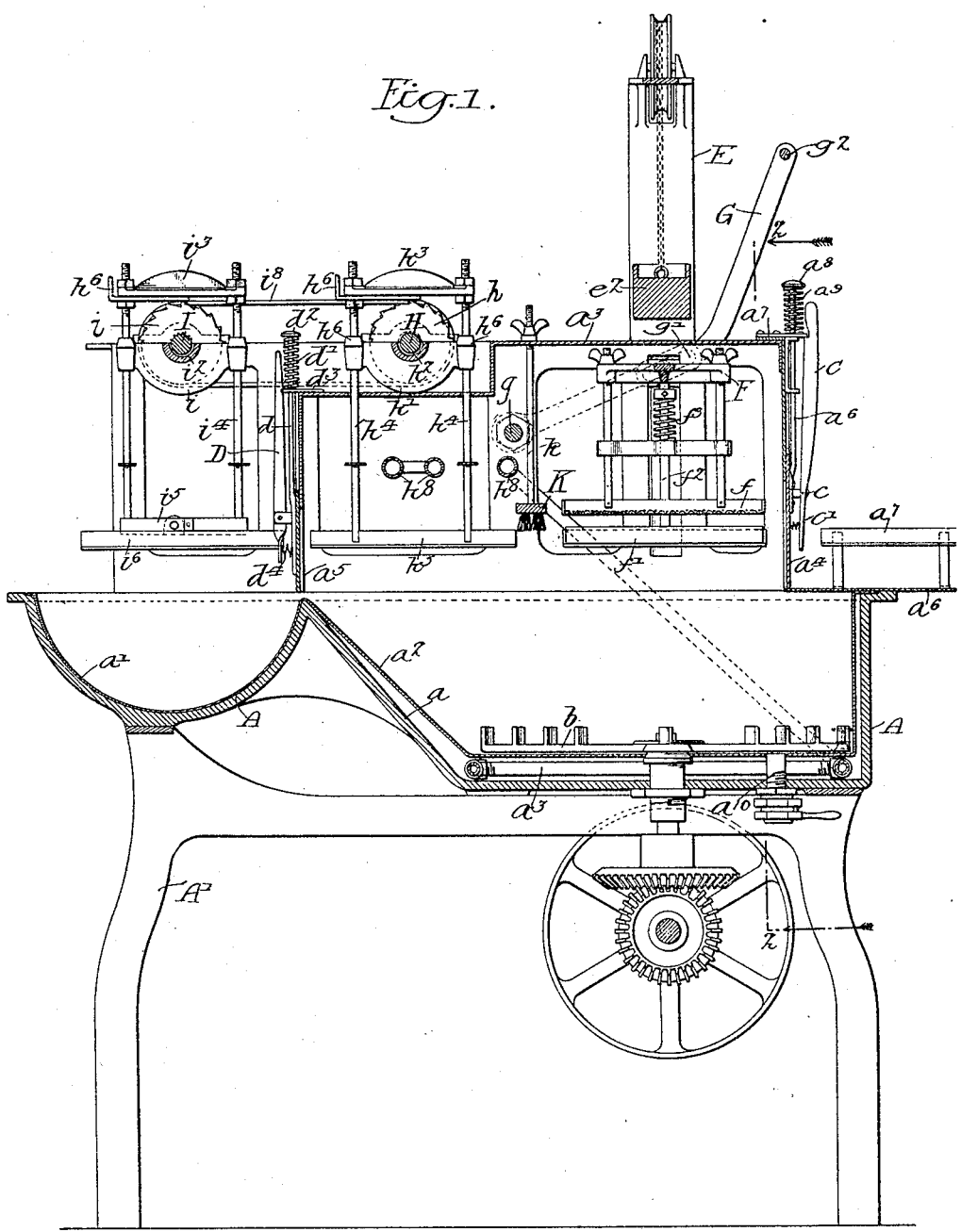

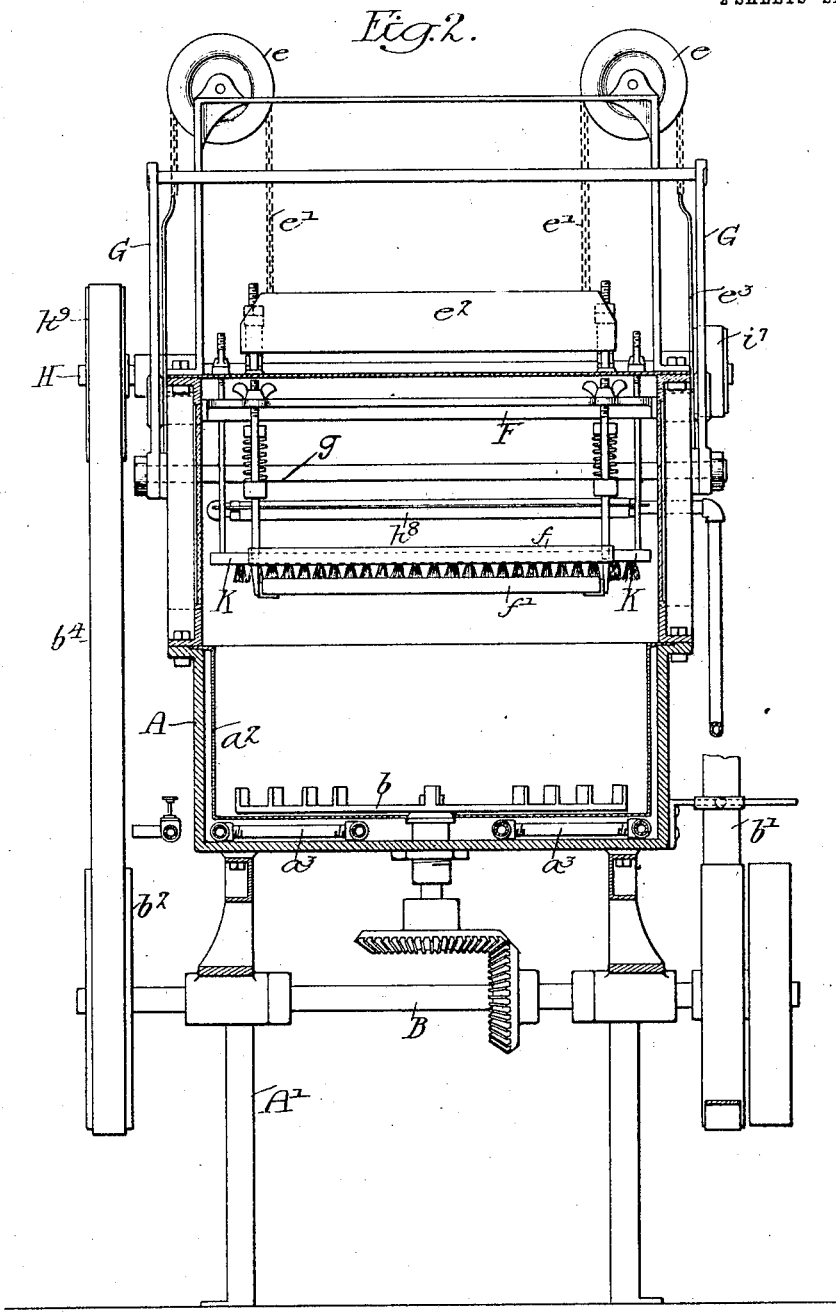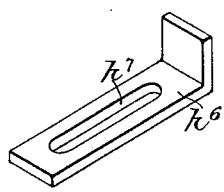

UNITED STATES PATENT OFFICE.

JASPER L. DERN, OF PHILADELPHIA, PENNSYLVANIA.

DIPPING-MACHINE.

SPECIFICATION forming part of Letters Patent No. 784,478, dated March 7, 1905.

Application filed March 24, 1904. Serial No. 199,785.

*To all whom it may concern:*

Be it known that I, JASPER L. DERN, a citizen of the United States, residing in Philadelphia, Pennsylvania, have invented certain Improvements in Dipping-Machines, of which the following is a specification.

The main object of my invention is to improve the detail construction of dipping-machines particularly designed for coating confectionery of various kinds with chocolate.

More especially I desire to provide mechanism whereby a tray filled with candy to be coated can be rapidly lowered into and raised by hand-power from a kettle containing melted chocolate.

It is further desired to so place auxiliary heating means within a casing containing portions of the dipping and knocking-off mechanism that it will most advantageously act upon the material under treatment.

I also desire to provide both adjustable and non-adjustable means for removing the surplus chocolate from candy after it has been dipped, the adjustable means being in the form of knocking mechanism, which may be made to subject a tray of dipped candy to light or heavy jarring, as desired.

Another object of the invention is to provide a novel arrangement of casing and doors therefor with the idea of securing the highest speed and efficiency of operation of the machine.

These objects, together with other novel features, I attain as hereinafter set forth, reference being had to the accompanying drawings, in which—

Figure 1 is a sectional elevation of my improved dipping-machine, showing the relative arrangement of the parts thereof. Fig. 2 is a sectional elevation taken on the line 2 2, Fig. 1; and Fig. 3 is a perspective view of the removable slide for adjusting the knocking mechanism.

In the above drawings, A' is a supporting-framework upon which is carried the casting A, forming the body portion of the machine, this consisting of a main container $a$, having one of its ends inclined toward a second containing vessel $a'$, which is preferably semicircular in vertical section, as shown. These two containers are provided with a lining $a^2$, of sheet material, such as copper, which in the case of the main container forms a kettle some distance from the sides and bottom of the container $a$, so as to form a space having within it heating-pipes $a^3$, through which under operating conditions hot-water, steam, or other gas is supplied. In the bottom of the lining extends a pipe $a^{10}$, through which the material contained in the main compartment or kettle may be drawn off.

A horizontal rotating stirrer $b$ is driven within the kettle from a shaft B through a pair of beveled gears, power being supplied to said shaft from a belt $b'$, which may engage with either a fast or a loose pulley in the customary manner. There is also on said shaft a pulley $b^2$, for a purpose hereinafter set forth.

Directly above the main container or kettle and covering the same is a casing $a^3$, preferably of sheet metal, having front and rear vertically-movable doors $a^4$ and $a^5$. Attached to the front of one of these doors is a rod $a^6$, projecting through a bracket $a^7$, fastened to the top of the casing and having on it a head $a^8$, between which and said bracket a spring $a^9$ is confined.

When the door is in its lowermost position, said spring is compressed and the door is held in said position by means of a lever C, which is pivoted to it at $c$ and is notched at its upper end, so as to engage the bracket $a^7$. A spring $c'$ engages the relatively short end of said lever C and tends to hold the notched end in engagement with said bracket $a^7$. The rear door of the casing is also provided with a rod $d$, having a spring $d'$ confined between its head $d^2$ and a bracket $d^3$ and similarly to the door $a^4$ is provided with a pivoted lever D, having a spring $d^4$, which normally retains its notched upper end in engagement with the bracket $d^3$.

Supported upon the top of the casing is a frame E, carrying on its upper member a pair of pulleys $e$, over which pass chains $e'$, one end of each of which is connected to a counterweight $e^2$. The opposite ends of these chains connect, respectively, to flat rods $e^3$, which in turn are connected to cylindrical projections from a frame F, contained within the casing. Said projections also respectively engage levers G, pivoted to the sides of the casing by means of a shaft or rod $g$ extending through the same and having slotted portions, as shown at $g'$ in Fig. 1, in which slide said projections of the frame F. The ends of the two levers are bent upwardly and are connected by the cross-bar $g^2$.

The frame F has rigidly suspended from it a screen $f$ and also carries a tray-supporting frame $f'$, carried by rods $f^2$, having springs $f^3$, which tend when the frame F is in its elevated position to move said tray-supporting frame toward the screen $f$. This is prevented by the engagement of its rods $f^2$ with the top of the casing $a^3$, although as the said frame F is moved downwardly said springs $f^3$ are free to act and immediately draw the frame $f'$ against the screen $f$, so that candy upon a tray on the frame $f'$ is properly retained in position during the dipping operation.

It will be noted that the rear portion of the casing $a^3$ is of a less height than the remainder in order to provide room outside of said casing for a horizontal shaft H, provided adjacent to its ends with a pair of knocking-wheels, one of which is seen at $h$. These latter have their lower portions inclosed in a casting $h'$, and this latter is extended in semicylindrical form completely across the machine under the main portion of the shaft H, as indicated at $h^2$. A second horizontal shaft I, extending over the container $a'$ of the machine, is similarly provided with knocking-wheels $i$, also in castings $i'$, which are extended, as shown at $i^2$, under said shaft. The arrangement in both cases is for the purpose of preventing the possibility of particles of oil or dirt of any kind dropping from the shaft upon the candies under treatment or upon the top of the casing, from which they might ultimately fall into the container $a'$. Such construction also efficiently braces the side portions of the machine and, moreover, serves as a protective device to prevent possible injury to an operator from the knocker-shafts.

Resting upon each of the knocking-wheels H is a cross-piece $h^3$, having depending bolts $h^4$ at its end, from which is carried a second tray-supporting frame $h^5$, it being noted that said bolts are guided by extensions $h^6$ on the casing $h'$ and extend through suitable openings in the top of the casing $a^3$. A flat piece of metal $h^6$, having a longitudinal slot $h^7$, is provided for each of the knocking-wheels $h$ as well as for the wheels $i$, each of said pieces having its end portion bent at an angle to the remainder and so placed under the cross-piece $h^3$ and $i^3$ that one of the bolts $h^4$ or $i^4$ pass through the slots $h^7$, it being noted that in either case said piece $h^6$ may be moved on its bolt, so as to be brought into or out of engagement with the teeth of its particular knocking-wheel.

In the case of the bolts $i^4$ there are pieces $i^5$ connecting their lower ends and having between them a third tray-supporting frame $i^6$, which is pivoted to said cross-pieces, so as to be revoluble upon a substantially horizontal axis.

In the front of the tray and outside of the casing is a table-like extension $a^6$, upon which are supported a pair of guides, one of which is shown at $a^7$. These guides are preferably in the same line as the three tray-supporting frames $f'$, $h^5$, and $i^6$, the first of these frames being in its elevated position. Above the frame $h^5$ within the casing and to the rear of the frame F and its adjacent parts are heating-pipes $h^8$, extending across said casing and preferably connected, as indicated in dotted lines in Fig. 1, to the heating-coils $a^3$ under the kettle $a^2$. Between the two tray-supporting frames $f'$ and $h^5$ are a series of transversely-extending brushes K, supported from bolts $k$, carried by the casing $a^3$ at such a height as to engage and remove a certain portion of the surplus chocolate remaining upon the candies after they are dipped and before the remainder of said surplus has been removed by the knocking-off mechanism.

As shown in Fig. 2, a belt $b^4$ connects the pulley-wheel $b^2$ on the shaft B with the pulley-wheel $h^9$ on the shaft H, while the belt $i^7$ connects a second pulley-wheel on said shaft with the pulley-wheel $i^8$ on the shaft I.

Under operating conditions the kettle contains a body of chocolate or other coating material which is agitated by the stirrer $b$ and kept in a fluid condition by means of heat supplied, preferably, from fluid in the coils $a^3$. A tray containing the candies to be dipped is placed upon the guides $a^7$ and being moved toward the casing $a^3$ is brought into engagement with the lower end of the lever C. Such engagement turns said lever on its pivot and releases the door $a^4$, so that it is moved upwardly under the action of the spring $a^9$. The tray is then pushed onto the supporting-frame $f'$, and this latter is immersed in the melted chocolate by a downward motion of the handle $g^2$, connected to the levers G. Such action raises the counterweight $e^2$, so that when said handle is released said weight immediately returns the tray $f'$ to its original position, the candies being retained upon the frame by means of the screen $f$, which operates as above described. Upon a second tray being pushed into the casing the first tray is pushed under the brushes K onto the receiving-frame $h^5$, which is violently vibrated by reason of the successive engagements of the teeth of the wheel $h$ with their respective cross-pieces $h^3$.

I have found it advisable to apply heat in the near vicinity of the candies upon the second tray in order that the surplus chocolate while adhering to them may be kept soft, so that it may be removed in the most advantageous manner by the knocking-off mechanism, and I secure this additional heat by means of the heating-pipes $h^8$. The entrance of a third tray pushes the second tray from the frame $f'$ onto the frame $h^5$, from which the first tray is pushed through the open door $a^5$ upon the supporting-frame $i^6$. Under the action of the knocking-wheels $i$, from which the frame is actuated, whatever surplus material still adheres to the candies is knocked off and falls into the container $a'$.

It will be noted that if the flat pieces $h^6$ are moved outwardly, so as not to be engaged by the teeth of the knocking-wheels, the cross-pieces $i^3$ and $h^3$ will be alternately raised and permitted to drop by an amount depending to a large extent upon the dimensions of the teeth of said wheels, while when said pieces are pushed inwardly into the position shown in the drawings said cross-pieces with their suspended frame have their amplitude of vibration increased to an extent depending upon the thickness of said pieces. It will be understood by those skilled in the art that in the latter case the jarring effect upon the candies treated will be much greater than in the former instance and will result in a different quality of goods from that secured when the adjustable piece is moved so as to be out of action.

While I have described my improved dipping-machine as particularly designed for coating confectionery with chocolate, it will be understood that it may be used for many similar purposes with equal advantage, and while I have illustrated a machine supplied with heat from hot-water or steam pipes it will be understood that such heating may be accomplished by means of hot air or gas.

I claim as my invention—

1. The combination in a dipping-machine of a tray for material to be treated, a kettle, a device for dipping the tray into the kettle, a knocking-off device including a shaft and a toothed wheel thereon, a tray-supporting structure acted upon by the toothed wheel and heating means extending between the tray when it is on the supporting structure of the knocking device and the wheel-shaft on said device, substantially as described.

2. The combination in a dipping-machine of a tray, a kettle, an inclosing casing, a device in the casing for dipping the tray into the kettle, a shaft having a toothed wheel, a cross-bar engaging said wheel outside of the casing and a tray-supporting structure in the casing connected to said cross-bar, with heating means in the casing adjacent to a tray on the said supporting structure and between the same and said shaft, substantially as described.

3. The combination in a dipping-machine of a tray, a kettle, means for heating the same, a casing over the kettle, dipping and knocking-off mechanism including a shaft and a knocking-wheel, said mechanism having portions within the casing for the reception of a tray, with a heating pipe or pipes in the casing adjacent to the tray when it is acted on by the knocking-off mechanism and in the rear of the dipping mechanism, said heating pipe or pipes extending between the knocking-wheel shaft and the tray-holding structure, substantially as described.

4. The combination in a dipping-machine of a kettle, a tray-supporting structure having a portion movable into the kettle, a lever connected to the structure and means acting upon said structure to normally retain the same in an elevated position, substantially as described.

5. The combination in a dipping-machine of a kettle, a tray-supporting structure having a portion movable into the kettle, a lever connected to the structure and a counterweight acting upon said structure to normally retain the same in an elevated position, substantially as described.

6. The combination in a dipping-machine of a kettle, a tray-supporting structure having a portion movable into the kettle, a lever connected to each side of said structure and provided with an operating-handle, with a counterweight having a flexible connection to the tray-supporting structure, substantially as described.

7. The combination in a dipping-machine of a kettle, a casing, a tray-supporting structure within the casing and movable into the kettle, a lever outside of the casing connected to the tray-supporting structure and having an operating-handle, with a counterweight operatively connected to said tray-supporting structure, substantially as described.

8. The combination in a dipping-machine of a kettle, a casing, a tray-supporting structure within the casing and movable into the kettle, a frame above the casing, pulleys thereon, pivoted levers and flexible connections attached to the tray-supporting structure, said connections passing over said pulleys and having a counterweight connected to them, substantially as described.

9. The combination of a kettle, a tray-supporting structure having means for moving it into said kettle and a knocking-off device, said device including a toothed wheel, a bar engaging the same, a second tray-supporting structure connected to the bar and means for adjusting the amplitude of the movement imparted to said second supporting structure by said wheel, substantially as described.

10. The combination of a kettle, a tray-supporting structure having means for moving it into said kettle and a knocking-off device, said device including a toothed wheel, a bar connected to the tray-supporting structure and normally resting upon said wheel, with a piece adjustable on said bar for varying the violence of the vibration imparted to the tray-supporting structure, substantially as described.

11. The combination of a kettle, a tray-supporting structure having means for moving it into the kettle and a knocking-off device, the same including a second tray-supporting structure and means for adjusting the amplitude of successive movements imparted thereto, substantially as described.

12. The combination of a kettle, a tray-supporting structure having means for moving it into the kettle, and a knocking-off device including a second tray-supporting structure, a toothed wheel, a cross-bar supporting said second structure and normally resting upon the teeth of said wheel, with an adjustable piece for varying the amount of movement imparted to said cross-bar by said wheel, substantially as described.

13. The combination of a kettle, a tray, a device for dipping the tray into the kettle, a knocking-off device and a brush between said two devices for removing surplus material from objects dipped, substantially as described.

14. The combination of a kettle, a tray, a supporting structure for the tray, mechanism for causing said structure to enter the kettle, knocking-off mechanism including a second tray-supporting structure, with a brush between said two structures placed to engage the objects on the tray as the latter is moved from one supporting structure to the other, substantially as described.

15. The combination in a dipping-machine, of a kettle, a casing, a plurality of tray-supporting structures within the casing, means for moving one of the structures into the kettle and knocking-off mechanism outside of the casing operative upon the other tray-supporting structure, substantially as described.

16. The combination in a dipping-machine, of a kettle, a casing, tray-supporting structures within the casing, means for moving one of the structures into the kettle, and mechanism outside of the casing operative upon a second tray-supporting structure for vibrating the same, with a second set of tray-vibrating mechanism wholly outside of the casing, substantially as described.

17. The combination in a dipping-machine of a kettle, three tray-supporting structures, means for moving one of the same at will into the kettle, and means for vibrating the other two structures, said means including two shafts respectively extending above the tray-supporting structures, toothed wheels on the shafts, a cross-bar engaging each wheel and depending means for connecting each cross-bar with its respective structure, substantially as described.

18. The combination in a dipping-machine of a kettle, a casing, a plurality of tray-supporting structures, means for dipping one of said structures into the kettle and knocking-off mechanism operatively connected to the other structures, said mechanism including shafts extending above the tray-supporting structures, said casing extending under one of the shafts, substantially as described.

19. The combination in a dipping-machine of two containers of which one includes a kettle, a plurality of tray-supporting structures, means for moving one of the same into the kettle, knocking-off mechanism operative upon the other tray-supporting structures and including knocking-wheels having operative shafts extending above their respective tray-supporting structures, one of said structures being over the second container, substantially as described.

20. The combination in a dipping-machine of two containers of which one includes a kettle, a casing extending over said kettle dipping mechanism, tray-supporting structures of which one is acted on by said mechanism, one of said structures being outside the casing and over the second container, with knocking-off mechanism for vibrating certain of the tray-supporting structures, said latter mechanism including shafts, knocker-wheels and cross-bars all placed above their respective tray-supporting structures, substantially as described.

21. In a dipping-machine, the combination of a frame, a kettle, means for dipping a tray into the same, a tray-supporting structure in addition to the dipping means, vibrating mechanism for said structure including a shaft extending over the structure, said shaft having a casing extending under it and attached to the frame of the machine, substantially as described.

22. In a dipping-machine the combination of a frame, a kettle, a plurality of tray-supporting structures, mechanism for dipping one of said structures into the kettle, a shaft carried in bearings on the frame, said shaft extending over a second tray-supporting structure, a toothed wheel on the shaft, and means actuated from said wheel for vibrating the second tray-supporting structure, there being a casing extending under the shaft and adjacent thereto, said casing rigidly connecting the bearings thereof, substantially as described.

23. The combination in a dipping-machine of two containers, of which one serves as a kettle, a plurality of tray-supporting structures, means for moving one of the same into the kettle, knocking-off mechanism operative upon the other tray-supporting structure including a knocking-wheel having an operating-shaft extending above its tray-supporting structure, said latter structure being over the second container, substantially as described.

24. The combination in a dipping-machine of two containers, of which one serves as a kettle, a plurality of tray-supporting structures, means for moving one of the same into the kettle, knocking-off mechanism operative upon the other tray-supporting structure including a knocking-wheel having an operating-shaft extending above its tray-supporting structure, said latter structure being reversibly supported over the second container, substantially as described.

In testimony whereof I have signed my name to this specification in the presence of two subscribing witnesses.

JASPER L. DERN.

Witnesses:
WILLIAM E. BRADLEY,
JOS. H. KLEIN.